United States Patent
Kim et al.

(10) Patent No.: US 8,252,867 B2
(45) Date of Patent: Aug. 28, 2012

(54) IMPACT STRENGTH MODIFIERS FOR THERMOPLASTIC POLYESTER AND THERMOPLASTIC POLYESTER RESIN COMPOSITION CONTAINING THE SAME

(75) Inventors: Yoon-Ho Kim, Jeollanam-do (KR); Geon-Soo Kim, Daejeon (KR); Sang-Il Nam, Jeollanam-do (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/812,088

(22) PCT Filed: Dec. 24, 2008

(86) PCT No.: PCT/KR2008/007646
§ 371 (c)(1),
(2), (4) Date: Jul. 8, 2010

(87) PCT Pub. No.: WO2009/091124
PCT Pub. Date: Jul. 23, 2009

(65) Prior Publication Data
US 2010/0292390 A1    Nov. 18, 2010

(30) Foreign Application Priority Data
Jan. 16, 2008  (KR) .................. 10-2008-0004707

(51) Int. Cl.
C08L 55/00    (2006.01)
C08L 51/04    (2006.01)
C08L 67/00    (2006.01)

(52) U.S. Cl. ............. 525/67; 525/63; 525/64; 525/418; 525/902; 525/932

(58) Field of Classification Search .......... 525/63, 525/64, 67, 69, 418, 902, 932
See application file for complete search history.

(56) References Cited

U.S. PATENT DOCUMENTS

| 4,117,034 A | 9/1978 | Steffancin |
| 4,180,494 A | 12/1979 | Fromuth et al. |
| 5,231,056 A | 7/1993 | Sandhu |
| 5,321,056 A * | 6/1994 | Carson et al. ............... 523/201 |
| 2006/0122324 A1* | 6/2006 | Onuma et al. ............... 525/64 |
| 2007/0043167 A1* | 2/2007 | Kim et al. ................... 525/82 |

FOREIGN PATENT DOCUMENTS

| CN | 1729251 A | 2/2006 |
| JP | 03200818 A | 9/1991 |
| JP | 09048922 A | 2/1997 |
| JP | 2007321158 A | 12/2007 |
| KR | 20020060011 A | 7/2002 |
| KR | 20030018671 A | 3/2003 |
| KR | 20040011905 A | 2/2004 |
| KR | 20050084865 A | 8/2005 |
| KR | 20070021894 A | 9/2008 |

OTHER PUBLICATIONS

Ha, Y. et al "Miscible blends of poly(benzoyl paraphenylene) and polycarbonate" Polymer vol. 42 (2001) pp. 6463-6472.*
International Search Report and Written Opinion, PCT/KR2008/007646, dated Aug. 11, 2009.
Office Action from China Application No. 2008-80123586.3, dated Oct. 19, 2011.

* cited by examiner

Primary Examiner — Irina S Zemel
Assistant Examiner — Jeffrey Lenihan
(74) Attorney, Agent, or Firm — Lerner, David, Littenberg, Krumholz & Mentlik, LLP

(57) ABSTRACT

The present invention relates to an impact strength modifier for thermoplastic polyester resin and a thermoplastic polyester resin composition containing the same, more precisely an impact strength modifier for thermoplastic polyester resin prepared by graft-polymerization of a) 20-80 weight % of multilayered rubber latex in which the ratio of particle diameter ($P_b/P_a$) of an inner layer ($P_a$) to outer layer is 1.05-1.5, and glass transition temperature of the inner layer or the outer layer is up to −30° C.; and b) 20-80 weight % of vinyl monomer. According to the present invention, a thermoplastic polyester resin composition having excellent transparency and improved impact strength can be provided by containing an impact strength modifier for thermoplastic polyester resin having multilayered structure in which content of rubber latex, glass transition temperature, particle diameter and refraction index are regulated.

4 Claims, No Drawings

IMPACT STRENGTH MODIFIERS FOR THERMOPLASTIC POLYESTER AND THERMOPLASTIC POLYESTER RESIN COMPOSITION CONTAINING THE SAME

CROSS REFERENCE TO RELATED APPLICATIONS

The present application is a national phase entry under 35 U.S.C. §371 of International Application No. PCT/KR2008/007646, filed Dec. 24, 2008, published in English, which claims priority from Korean Patent Application No. 10-2008-0004707, filed Jan. 16, 2008. The disclosures of said applications are incorporated by reference herein.

TECHNICAL FIELD

The present invention relates to an impact strength modifier for thermoplastic polyester and a thermoplastic polyester resin composition containing the same, and precisely, to a thermoplastic polyester resin composition with improved impact strength and transparency by comprising a multilayered impact strength modifier for a thermoplastic polyester resin in which the content of rubber latex, glass transition temperature, particle diameter and refraction index are regulated.

BACKGROUND ART

Up to date, to improve impact strength of thermoplastic polyester resin, studies have been undergoing on thermoplastic polyester resin compositions composed of thermoplastic polyester resin and thermoplastic graft copolymer, the impact strength modifier. However, as impact strength increased, other physical properties decreased. For example, U.S. Pat. No. 4,117,034 and No. 4,180,494 describe a method to improve impact strength of a polyester resin composition by adding a core-shell type polymer containing butadiene-based core to thermoplastic polyester resin as an impact strength modifier. However, this method has a problem of damaging transparency of the polyester resin composition.

As an effort to retain transparency of polyester resin, U.S. Pat. No. 5,231,056 and No. 5,409,967 describe a method to increase impact strength of a polyester resin composition by adding an impact modifier in which shell is composed of styrene copolymer to polyester resin. According to this method, transparency of the polyester resin composition was preserved but impact strength was not improved satisfactorily.

Korean Patent Publication Nos. 2002-0060011, 2003-0018671 and 2007-0021894 describe a method of using rubber latex having multi-layered structure for graft copolymer in order to improve impact strength of polychlorinated resin. However, when this method was applied on a thermoplastic polyester resin composition, transparency was decreased because of difference of refraction index.

DISCLOSURE OF INVENTION

To overcome the above problems of the prior art, it is an object of the present invention to provide an impact strength modifier for thermoplastic polyester resin having multi-layered structure in which the content of rubber latex, glass transition temperature, particle diameter and refraction index are regulated, and at the same time provide a thermoplastic polyester resin composition with improved transparency and impact strength containing the same.

The above object and other objects of the present invention can be achieved by the following embodiments of the present invention.

To achieve the above object, the present invention provides an impact strength modifier for thermoplastic polyester resin prepared by graft polymerization of a) 20-80 weight % of multilayered rubber latex in which the ratio of particle diameter ($P_b/P_a$) of an inner layer ($P_a$) to an outer layer ($P_b$) is 1.05-1.5, and glass transition temperature of the inner layer or the outer layer is up to −30° C.; and b) 20-80 weight % of vinyl monomer, and a thermoplastic polyester resin composition with improved transparency and impact strength containing the same.

Hereinafter, the present invention is described in detail.

The present inventors studied on a thermoplastic polyester resin composition having excellent transparency and impact strength comprising thermoplastic polyester resin and thermoplastic graft copolymer acting as an impact strength modifier for thermoplastic polyester resin. At last, the present inventors confirmed that impact strength of the thermoplastic polyester resin composition could be significantly improved by regulating glass transition temperature and particle diameter ratio of an inner layer to an outer layer of a multilayered rubber latex used as a matrix for thermoplastic graft copolymer. And also, the inventors confirmed that when difference of refraction index between thermoplastic graft copolymer and thermoplastic polyester resin was regulated to up to 0.005, a thermoplastic polyester resin composition having excellent transparency was produced, based on which the present inventors completed this invention.

The impact strength modifier for thermoplastic polyester resin of the present invention is characteristically prepared by graft-polymerization of a) 20-80 weight % of multilayered rubber latex in which the ratio of particle diameter ($P_b/P_a$) of an inner layer ($P_a$) to an outer layer ($P_b$) is 1.05-1.5, and glass transition temperature of the inner layer or the outer layer is up to −30° C.; and b) 20-80 weight % of vinyl monomer.

The impact strength modifier for thermoplastic polyester resin herein is a thermoplastic graft copolymer whose refraction index is determined by refraction rate and content of the rubber latex used for the preparation of graft copolymer and the composition and content of a monomer to be grafted.

The refraction rate herein can be explained as the refraction index of substance C comprising substance A and substance B, which can be calculated by the following mathematical formula 1.

MathFigure 1

$$RI_C = RI_A \times Wt_A + RI_B \times Wt_B \qquad [\text{Math.1}]$$

Wherein, RIC is the refraction index of C, $RI_A$ is the refraction index of A, $Wt_A$ is the weight ratio of A (weight of A/(weight of A+weight of B)), RIB is the refraction index of B and WtB is the weight ratio of B.

The thermoplastic graft copolymer herein is prepared by graft-polymerization of 20-80 weight % of multilayered rubber latex and 20-80 weight % of one or more monomers selected from the group consisting of vinyl monomers.

The multilayered rubber latex herein is composed of the inner layer and the outer layer. The ratio of the inner layer particle diameter ($P_a$) to the outer layer particle diameter ($P_b$) ($P_b/P_a$) is 1.05-1.5, preferably 1.1-1.3. Glass transition temperature of the inner or the outer layer is preferably up to −30° C. considering the impact strength improving effect. If the particle diameter ratio ($P_b/P_a$) is less than 1.05 or bigger than 1.5, the impact strength improving effect would not be so great. And, if the glass transition temperature of the inner layer or the outer layer is higher than −30° C., the impact strength improving effect would not be so great, either.

The rubber latex herein is composed of a conjugated diene monomer, an ethylene unsaturated aromatic compound and a cross-linking agent. Glass transition temperature and refraction index of the rubber latex can be regulated by regulating the kind and content of the conjugated diene monomer, the ethylene unsaturated aromatic compound and the cross-linking agent. It can also be regulated considering the kind of the thermoplastic polyester resin and the wanted physical properties thereof. Therefore, contents of the conjugated diene monomer, the ethylene unsaturated aromatic compound and the cross-linking agent for cross-linking thereof are not limited in this invention.

The conjugated diene monomer used for the preparation of the rubber latex above plays a role in absorbing impact from outside to increase impact resistance, and is one or more compounds selected from the group consisting of butadiene, isoprene and chloroisoprene.

The ethylene unsaturated aromatic compound used for the preparation of the rubber latex above plays a role in inhibiting scattering of light generated by difference of refraction index by regulating refraction index of the rubber latex to be equal to refraction index of the thermoplastic polyester resin, suggesting that it plays a role in retaining transparency. The ethylene unsaturated aromatic compound herein can be one or more compounds selected from the group consisting of styrene, α-methylstyrene, isopropylphenylnaphthalene, vinylnaphthalene, alkylstyrene in which one or more hydrogen atoms in benzene ring are substituted with alkyl having 1 to 3 carbon atoms and halogenated styrene in which one or more hydrogen atoms in benzene ring are substituted with halogens.

A cross-linking agent can be used for the preparation of the rubber latex. The cross-linking agent herein plays a role in regulating cross-linking degree of the rubber latex and is one or more compounds preferably selected from the group consisting of divinylbenzene, ethyleneglycoldimethacrylate, diethyleneglycoldimethacrylate, triethyleneglycoldimethacrylate, 1,3-butyleneglycoldimethacrylate, arylmethacrylate and 1,3-butyleneglycoldiacrylate.

The content of the cross-linking agent for the preparation of the rubber latex is up to 5 weight % by 100 weight % of the total monomer (including the cross-linking agent), but is preferably up to 2 weight % to improve impact strength of the thermoplastic polyester resin.

In this invention, the rubber latex can be prepared by any conventional method well known to those in the art and not limited to a specific method.

The particle diameter and gel content in the rubber latex are not limited, either.

The method for preparing the thermoplastic graft copolymer herein contains the step of graft emulsion polymerization comprising one or more stages using 20-80 weight % of the rubber latex prepared by the above method and 20-80 weight % of one or more monomers selected from the group consisting of vinyl monomers. At this time, if at least two or more stages are used, content of the monomer grafted to the rubber latex can be varied stage by stage. But, the content of the monomer in stage 1 or stage 2 can be regulated according to the kind of monomer grafted and the refraction index targeted.

If the content of the rubber latex in the thermoplastic graft copolymer is less than 20 weight %, the impact strength improving effect will not be so great. On the contrary, it the content of the rubber latex is more than 80 weight %, compatibility of the rubber latex with the thermoplastic polyester resin will be reduced, resulting in the decrease of dispersibility and mechanical properties.

The vinyl monomer herein plays a role in increasing compatibility of the rubber latex with the thermoplastic polyester resin and regulating refraction index of the thermoplastic graft copolymer to be equal to that of the thermoplastic polyester resin so as to inhibit light scattering caused by difference in refraction index and to maintain transparency. The vinyl monomer is preferably one or more compounds selected from the group consisting of aromatic vinyl compound such as styrene, α-methylstyrene, isopropylphenylnaphthalene, vinylnaphthalene, styrene substituted with alkyl having 1 to 3 carbon atoms and halogen substituted styrene; alkyl(meth)acrylate such as methyl-methacrylate, ethylmethacrylate, benzylmethacrylate, methylacrylate, ethylacrylate and butylacrylate; (meth)acrylic acid ester containing hydroxyl group or alkoxy group such as hydroxyalkyl(meth)acrylate and alkoxyalkyl(meth)acrylate; vinyl cyanide compound such as acrylonitrile; (meth)acrylic acid; and maleimide compound. And the same compound used for the production of the rubber latex can also be used.

In the method for preparing the thermoplastic graft copolymer, a reacting medium, an initiator, an emulsifier, a catalyst, and a stabilizer can be used without limitation at a general concentration as long as they are the ones well informed to those in the art. For example, the emulsifier can be selected among diverse emulsifiers for emulsion polymerization well known to those in the art and is preferably exemplified by fatty acid salts such as fatty acid potassium salt and oleic acid potassium salt and weak acid alkali metal salts. The polymerization initiator herein can be selected from the group consisting of water-soluble polymerization initiators such as sodium persulfate, potassium persulfate and peroxy compound; and fat-soluble polymerization initiators such as cumenehydro peroxide, diisopropyl benzenehydro peroxide, azobis isobutylnitrile, third grade butyl hydro peroxide, paramethane hydro peroxide and benzoyl peroxide. More details are described in Examples.

Conditions for graft polymerization of the rubber latex are not limited specifically.

The thermoplastic polyester resin composition of the present invention comprises 50-95 weight % of the thermoplastic polyester resin and 5-50 weight % of the impact strength modifier for a thermoplastic polyester resin and at this time the difference of refraction index between the thermoplastic polyester resin and the impact strength modifier for a thermoplastic polyester resin is characteristically up to 0.005.

The thermoplastic polyester resin composition retains excellent transparency by regulating refraction index of the thermoplastic graft polymer to be equal to that of the thermoplastic polyester resin.

The relation of refraction index between the impact strength modifier for a thermoplastic polyester resin (thermoplastic graft copolymer) and the thermoplastic polyester resin has to meet the following mathematical formula 2 in order to maintain excellent transparency.

[Mathematical Formula 2]

MathFigure 2

$$|RI_A - RI_B| \leq 0.005 \text{ (preferably 0.003)} \qquad \text{[Math.2]}$$

The thermoplastic polyester resin is a polymer material having ester group (—COO—) in molecular structure, which has been widely used in a variety of field because of excellent physical properties such as transparency, mechanical properties, gas barrier property and heat-resistance; chemical properties such as solvent resistance, acid resistance and alkali resistance; economic efficiency; and re-usability. The resin can be processed by extrusion molding, blow molding and calendar molding.

The thermoplastic polyester resin composition of the present invention preferably comprises 5-50 weight % of the impact strength modifier for a thermoplastic polyester resin and 50-95 weight % of the thermoplastic polyester resin. If the content of the impact strength modifier for thermoplastic polyester resin is less than 5 weight %, the impact strength improving effect will be in doubt. In the meantime, if the content is more than 50 weight %, the mechanical strength will be reduced.

The thermoplastic resin composition herein can additionally include an additive such as a process oil, a lubricating oil, an antioxidant, a thermo-stabilizer, a lubricant and a pigment by the conventional content.

Practical and presently preferred embodiments of the present invention are illustrative as shown in the following Examples.

However, it will be appreciated that those skilled in the art, on consideration of this disclosure, may make modifications and improvements within the spirit and scope of the present invention.

EXAMPLES

Example 1

Preparation of Rubber Latex

The content of each compound indicates weight % by 100 weight % of the monomer mixture used for the preparation of rubber latex and weight part by 100 weight part of the monomer mixture.

150 weight part of ion exchange water, 0.5 weight part of buffer, 1.0 weight part of potassium oleate, 0.0047 weight part of ethylenediamine tetrasodiumacetate, 0.003 weight part of ferrous sulfate, 0.02 weight part of sodiumformaldehyde sulfoxide and 0.1 weight part of diisopropylbenzene hydroperoxide were loaded in a 120 liter high pressure polymerization container equipped with a stirrer.

For the inner layer reaction, 15 weight % of butadiene, 34.5 weight % of styrene and 0.5 weight % of divinylbenzene were added thereto, followed by polymerization at 40° C. for 6 hours. When polymerization conversion rate of the monomer reached 90% or up, 45 weight % of butadiene, 4.5 weight % of styrene, 0.5 weight % of divinylbenzene and 0.5 weight part of potassium oleate were added for the outer layer reaction, followed by polymerization at 60° C. for 6 hours. As a result, rubber latex of 100 nm in particle diameter was obtained and the polymerization conversion rate was 98%.

<Preparation of Thermoplastic Graft Copolymer>

The content of each compound indicates weight % by 100 weight % of the mixture of the rubber latex and the newly added monomer for the preparation of thermoplastic graft copolymer and weight part by 100 weight part of the mixture of the rubber latex and the newly added monomer.

45 weight % of the rubber latex prepared above (solid powder) was loaded in a sealed reactor, which was filled with nitrogen. 0.04 weight part of ethylenediamine tetrasodiumacetate, 0.024 weight part of ferrous sulfate and 0.16 weight part of sodiumformaldehyde sulfoxide were added thereto. Then, 5 weight % of hydroxyethylmethacrylate, 50 weight % of styrene, 1.0 weight part of potassium oleate, 55 weight part of ion exchange water and 0.2 weight part of t-butyl hydroperoxide were added thereto at 60° C. for 2 hours, followed by polymerization for one more hour.

<Preparation of Thermoplastic Graft Copolymer Powder>

The thermoplastic graft copolymer prepared as latex above was coagulated by using HCl to separate polymer and water, which were dehydrated and dried to give thermoplastic graft copolymer powder.

<Preparation of Thermoplastic Polyester Resin Composition Sheet>

80 weight % of the thermoplastic polyester resin having refraction index of 1.565 was mixed with 20 weight % of the thermoplastic graft copolymer prepared above, followed by melt-mixing at 250° C. using an extruder to give pellet. The pellet proceeded to T-die extrusion at 220° C. to give 0.5 mm thick sheet.

Example 2

To prepare rubber latex, polymerization was performed by the same manner as described in Example 1 except that 30 weight % of butadiene, 39 weight % of styrene and 1.0 weight % of divinylbenzene were added for the inner layer reaction and 30 weight % of butadiene alone was added for the outer layer reaction.

Example 3

To prepare rubber latex, polymerization was performed by the same manner as described in Example 1 except that 40 weight % of butadiene, 9.5 weight % of styrene and 0.5 weight % of divinylbenzene were added for the inner layer reaction and 20 weight % of butadiene, 29.5 weight % of styrene and 0.5 weight % of divinylbenzene were added for the outer layer reaction.

Example 4

To prepare rubber latex, polymerization was performed by the same manner as described in Example 1 except that 37.5 weight % of butadiene, 12 weight % of styrene and 0.5 weight % of divinylbenzene were added for the inner layer reaction and 37.5 weight % of butadiene, 12 weight % of styrene and 0.5 weight % of divinylbenzene were added for the outer layer reaction. 30 weight % of the rubber latex, 7 weight % of hydroxyethylmethacrylate, 63 weight % of styrene and 1.5 weight part of potassium oleate were used for polymerization to give thermoplastic graft copolymer.

Example 5

To prepare rubber latex, polymerization was performed by the same manner as described in Example 1 except that 25 weight % of butadiene, 44 weight % of styrene and 1.0 weight % of divinylbenzene were added for the inner layer reaction and 25 weight % of butadiene and 5 weight % of styrene were added for the outer layer reaction. 60 weight % of the rubber latex, 4 weight % of hydroxyethylmethacrylate and 36 weight % of styrene were used for polymerization to give thermoplastic graft copolymer.

Comparative Example 1

Thermoplastic polyester resin composition sheet was prepared by the same manner as described in Example 1 except that 97 weight % of thermoplastic polyester resin and 3 weight % of thermoplastic graft copolymer were mixed.

Comparative Example 2

Thermoplastic polyester resin composition sheet was prepared by the same manner as described in Example 1 except that 45 weight % of thermoplastic polyester resin and 55 weight % of thermoplastic graft copolymer were mixed.

Comparative Example 3

To prepare rubber latex, polymerization was performed by the same manner as described in Example 1 except that 50 weight % of butadiene alone was added for the inner layer reaction and 50 weight % of butadiene alone was added for the outer layer reaction. 18 weight % of the rubber latex, 9 weight % of hydroxyethylmethacrylate, 73 weight % of styrene and 2.0 weight part of potassium oleate were used for polymerization to give thermoplastic graft copolymer.

Comparative Example 4

To prepare rubber latex, polymerization was performed by the same manner as described in Example 1 except that 25 weight % of butadiene, 54 weight % of styrene and 1.0 weight % of divinylbenzene were added for the inner layer reaction and 15 weight % of butadiene and 5 weight % of styrene were added for the outer layer reaction. 85 weight % of the rubber latex, 1.5 weight % of hydroxyethylmethacrylate, 13.5 weight % of styrene and 0.5 weight part of potassium oleate were used for polymerization to give thermoplastic graft copolymer.

Comparative Example 5

To prepare rubber latex, polymerization was performed by the same manner as described in Example 1 except that 50 weight % of butadiene, 39 weight % of styrene and 1.0 weight % of divinylbenzene were added for the inner layer reaction and 10 weight % of butadiene alone was added for the outer layer reaction.

Comparative Example 6

To prepare rubber latex, polymerization was performed by the same manner as described in Example 1 except that 15 weight % of butadiene and 5 weight % of styrene were added for the inner layer reaction and 45 weight % of butadiene, 34 weight % of styrene and 1.0 weight % of divinylbenzene were added for the outer layer reaction.

Comparative Example 7

To prepare rubber latex, polymerization was performed by the same manner as described in Example 1 except that 30 weight % of butadiene, 19.5 weight % of styrene and 0.5 weight % of divinylbenzene were added for the inner layer reaction and 30 weight % of butadiene, 19.5 weight % of styrene and 0.5 weight % of divinylbenzene were added for the outer layer reaction.

Comparative Example 8

To prepare rubber latex, polymerization was performed by the same manner as described in Example 1 except that 37.5 weight % of butadiene, 12 weight % of styrene and 0.5 weight % of divinylbenzene were added for the inner layer reaction and 37.5 weight % of butadiene, 12 weight % of styrene and 0.5 weight % of divinylbenzene were added for the outer layer reaction.

Comparative Example 9

To prepare rubber latex, polymerization was performed by the same manner as described in Example 1 except that 25 weight % of butadiene, 54 weight % of styrene and 1.0 weight % of divinylbenzene were added for the inner layer reaction and 15 weight % of butadiene and 5 weight % of styrene were added for the outer layer reaction.

Experimental Example

Evaluation of Refraction Index

Refraction index was measured by using Abbe Refractometer at 25° C.

Evaluation of Impact Strength

The sheets prepared in Examples 1-5 and Comparative Examples 1-9 were cut into 0.5 mm thick samples (10 cm×14 cm), followed by aging at 25° C. for 2 hours. Circular saw spinning at the speed of 15 mm/sec was applied to the samples and rpm that was able to break 50% of the sample was measured.

Evaluation of Transparency

The sheets prepared in Examples 1-5 and Comparative Examples 1-9 were cut into 3 mm thick samples for the evaluation of transparency by ASTM D1003 by using heat press at 130° C. Haze value of each sample was measured by using Haze Meter.

Transparency and impact strength of the thermoplastic polyester resin compositions prepared in Examples 1-5 and Comparative Examples 1-9, content and refraction index of the thermoplastic graft copolymer used, content of the rubber latex used, particle diameter of an inner layer to an outer layer, and glass transition temperatures of the inner layer and the outer layer were measured. The results are shown in Table 1.

Transparency of the thermoplastic polyester resin composition is preferably up to Haze value of 5.0 and impact strength is preferably at least 500 rpm.

TABLE 1

| | Rubber latex | | | | Content of graft copolymer | Refraction index of graft copolymer | Transparency (Haze) | Impact strength (rpm) |
|---|---|---|---|---|---|---|---|---|
| | Content | $P_b/P_a$ | $Tg_a$ | $Tg_b$ | | | | |
| Example 1 | 45 | 1.25 | 30 | −50 | 20 | 1.564 | 3.7 | 680 |
| Example 2 | 45 | 1.13 | 10 | −60 | 20 | 1.564 | 3.9 | 700 |
| Example 3 | 45 | 1.24 | −40 | 15 | 20 | 1.564 | 3.9 | 620 |
| Example 4 | 30 | 1.23 | −35 | −35 | 20 | 1.565 | 3.2 | 540 |

TABLE 1-continued

| | Rubber latex | | | | Content of graft copolymer | Refraction index of graft copolymer | Transparency (Haze) | Impact strength (rpm) |
|---|---|---|---|---|---|---|---|---|
| | Content | $P_b/P_a$ | $Tg_a$ | $Tg_b$ | | | | |
| Example 5 | 60 | 1.14 | 20 | −45 | 20 | 1.563 | 4.8 | 780 |
| Comparative Example 1 | 45 | 1.25 | 30 | −50 | 3 | 1.564 | 1.8 | 280 |
| Comparative Example 2 | 45 | 1.25 | 30 | −50 | 55 | 1.564 | 12.2 | 250 |
| Comparative Example 3 | 18 | 1.26 | −60 | −60 | 20 | 1.565 | 3.5 | 360 |
| Comparative Example 4 | 85 | 1.10 | 30 | −35 | 20 | 1.564 | 10.5 | 230 |
| Comparative Example 5 | 45 | 1.04 | −10 | −60 | 20 | 1.564 | 2.9 | 340 |
| Comparative Example 6 | 45 | 1.65 | −35 | −10 | 20 | 1.564 | 2.7 | 280 |
| Comparative Example 7 | 45 | 1.27 | −15 | −15 | 20 | 1.564 | 2.7 | 340 |
| Comparative Example 8 | 45 | 1.23 | −35 | −35 | 20 | 1.559 | 7.9 | 810 |
| Comparative Example 9 | 45 | 1.10 | 30 | −35 | 20 | 1.571 | 8.4 | 450 |

*Refraction index of thermoplastic polyester resin: 1.565

As shown in Table 1, transparency and impact strength of the thermoplastic polyester resin composition can be improved by regulating content and refraction index of the thermoplastic graft copolymer, the impact strength modifier for thermoplastic polyester resin. As explained in Examples 1-5, when content of the impact strength modifier for thermoplastic polyester resin of the present invention (thermoplastic graft copolymer) was 5-50 weight % and refraction index of the thermoplastic polyester resin composition was regulated to be equal to that of the thermoplastic polyester resin, transparency and impact strength were excellent. As shown in Comparative Examples 1-2, when content of the impact strength modifier for thermoplastic polyester resin (thermoplastic graft copolymer) was too low or too high, the impact strength improving effect could not be expected or the mechanical strength was reduced. As shown in Comparative Examples 8-9, when refraction index of the impact strength modifier for thermoplastic polyester resin (thermoplastic graft copolymer) was much different from that of the thermoplastic polyester resin, the composition turned into opaque.

As shown in Comparative Examples 3-4, when content of the rubber latex was too low or too high, out of the range determined in this invention, the impact strength improving effect could not be expected. As shown in Comparative Examples 5-6, when particle diameter ratio of the inner layer of the rubber latex to the outer layer was out of the range determined in this invention, which means the difference of particle diameter ratio was too big or too small, the impact strength improving effect was not seen. As shown in Comparative Example 7, when glass transition temperatures of the inner and outer layers were all higher than −30° C., the impact strength improving effect was minute.

Therefore, it was confirmed that when particle diameter ratio of the inner layer of the rubber latex to the outer layer is 1.05-1.5, glass transition temperature of the inner or outer layer is up to −30° C., and refraction index of the impact strength modifier for thermoplastic polyester resin (thermoplastic graft copolymer) is regulated to be the same as that of the thermoplastic polyester resin, the produced thermoplastic polyester resin composition has excellent transparency and improved impact strength.

INDUSTRIAL APPLICABILITY

The present invention provides a thermoplastic polyester resin composition with excellent transparency and improved impact strength by containing an impact strength modifier for thermoplastic polyester resin having multilayered structure in which content of rubber latex, glass transition temperature, particle diameter and refraction index are regulated.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A thermoplastic polyester resin composition having excellent transparency and impact strength, which contains 50-95 weight % of a thermoplastic polyester resin and 5-50 weight % of an impact strength modifier for a thermoplastic polyester resin,
wherein the impact strength modifier is prepared by graft-polymerization of: a) 20-80 weight % of multilayered rubber latex in which the ratio of particle diameter ($P_b/P_a$) of an inner layer ($P_a$) to an outer layer $P_b$ is 1.05-1.5, and glass transition temperature of the inner layer or outer layer is up to −30° C., and b) 20-80 weight % of vinyl monomer;
the thermoplastic polyester resin is characterized in that the difference of refraction index between the thermoplastic polyester resin and the impact strength modifier for a thermoplastic polyester resin is up to 0.005;
the multilayered rubber latex of the impact strength modifier comprises a conjugated diene monomer, an ethylene unsaturated aromatic compound and a cross-linking agent;
the conjugated diene monomer is one or more compounds selected from the group consisting of butadiene, isoprene and chloroisoprene and is used in an amount ranging from 50 to 60 weight % of the multilayered rubber latex; and the ethylene unsaturated aromatic compound is used in an amount ranging from 39 to 49 weight % of the multilayered rubber latex.

2. The thermoplastic polyester resin composition having excellent transparency and impact strength according to claim 1, wherein the thermoplastic polyester resin composition further comprises one or more additives selected from the group consisting of a process oil, a lubricating oil, an antioxidant, a thermo-stabilizer, a lubricant and a pigment.

3. The thermoplastic resin composition having excellent transparency and impact strength according to claim 1, wherein the difference of refraction index between the thermoplastic polyester resin and the impact strength modifier for a thermoplastic polyester resin is up to 0.003.

4. A thermoplastic polyester resin composition having excellent transparency and impact strength, which contains 50-95 weight % of a thermoplastic polyester resin and 5-50 weight % of an impact strength modifier for a thermoplastic polyester resin, wherein the impact strength modifier is prepared by graft-polymerization of: a) 20-80 weight % of multilayered rubber latex in which the ratio of particle diameter ($P_b/P_a$) of an inner layer ($P_a$) to an outer layer ($P_b$) is 1.05-1.5, and glass transition temperature of the inner layer or outer layer is up to −30° C., and b) 20-80 weight % of vinyl monomer;

the thermoplastic polyester resin is characterized in that the difference of refraction index between the thermoplastic polyester resin and the impact strength modifier for a thermoplastic polyester resin is up to 0.005;

the multilayered rubber latex of the impact strength modifier comprises a conjugated diene monomer, an ethylene unsaturated aromatic compound and a cross-linking agent;

the inner layer ($P_a$) comprises 50-70 weight % of the multilayered rubber latex;

the outer layer ($P_b$) comprises 30-50 weight % of the multilayered rubber latex;

the conjugated diene monomer is one or more compounds selected from the group consisting of butadiene, isoprene and chloroisoprene and is used in an amount ranging from 50 to 60 weight % of the multilayered rubber latex; and the ethylene unsaturated aromatic compound is used in an amount ranging from 39 to 49 weight % of the multilayered rubber latex.

\* \* \* \* \*